US012530007B2

(12) United States Patent
Franz et al.

(10) Patent No.: US 12,530,007 B2
(45) Date of Patent: Jan. 20, 2026

(54) PROGRAMMABLE LOGIC CONTROLLER WITH VOICE CONTROL

(71) Applicant: ABB Schweiz AG, Baden (CH)

(72) Inventors: Dominik Franz, Haßloch (DE); Andreas Wilmers, Heidelberg (DE)

(73) Assignee: ABB Schweiz AG, Baden (CH)

( * ) Notice: Subject to any disclaimer, the term of this patent is extended or adjusted under 35 U.S.C. 154(b) by 126 days.

(21) Appl. No.: 18/335,369

(22) Filed: Jun. 15, 2023

(65) Prior Publication Data
US 2023/0409000 A1    Dec. 21, 2023

(30) Foreign Application Priority Data

Jun. 15, 2022  (EP) .................................... 22179155

(51) Int. Cl.
*G05B 19/05* (2006.01)
*G06F 40/30* (2020.01)
*G10L 15/08* (2006.01)

(52) U.S. Cl.
CPC ........... *G05B 19/054* (2013.01); *G06F 40/30* (2020.01); *G10L 15/083* (2013.01); *G05B 2219/13169* (2013.01); *G10L 2015/088* (2013.01)

(58) Field of Classification Search
CPC ....... G05B 19/54; G06F 40/30; G10L 15/083; G10L 2015/088
See application file for complete search history.

(56) References Cited

U.S. PATENT DOCUMENTS

| 4,462,080 A * | 7/1984 | Johnstone ............ G05B 19/409 704/200 |
| 9,824,689 B1 * | 11/2017 | Shapiro ................... G10L 15/22 |
| 2002/0152079 A1 * | 10/2002 | Furuta ....................... E02F 9/26 704/275 |
| 2006/0198608 A1 * | 9/2006 | Girardi ............... G06F 16/7844 386/231 |
| 2007/0257829 A1 * | 11/2007 | Lavery ................ H03M 1/1225 341/158 |

(Continued)

FOREIGN PATENT DOCUMENTS

WO    WO 2018/037435 A1    3/2018

OTHER PUBLICATIONS

Brinkmann, "Control your Application with Voice Commands," archive, *Makers Blog*, downloaded from Internet at https://www.plcnext-community.net/makersblog/control-your-application-with-voice-commands/, 3 pp. (May 8, 2019).

(Continued)

*Primary Examiner* — Eric T Oberly
(74) *Attorney, Agent, or Firm* — Fitch Even Tabin & Flannery LLP

(57) ABSTRACT

A programmable logic controller (PLC) with voice control includes a CPU configured to run an application program, a condition monitoring system (CMS) configured to provide condition data of an industrial unit, a microphone input for providing microphone data, the microphone input connected with the CMS, which is configured to receive the microphone data, determine an audio file using the received microphone data, and provide the audio file to the CPU; wherein the application program is configured to determine a control command for the PLC using the provided audio file.

15 Claims, 1 Drawing Sheet

(56) References Cited

U.S. PATENT DOCUMENTS

Figure 1:
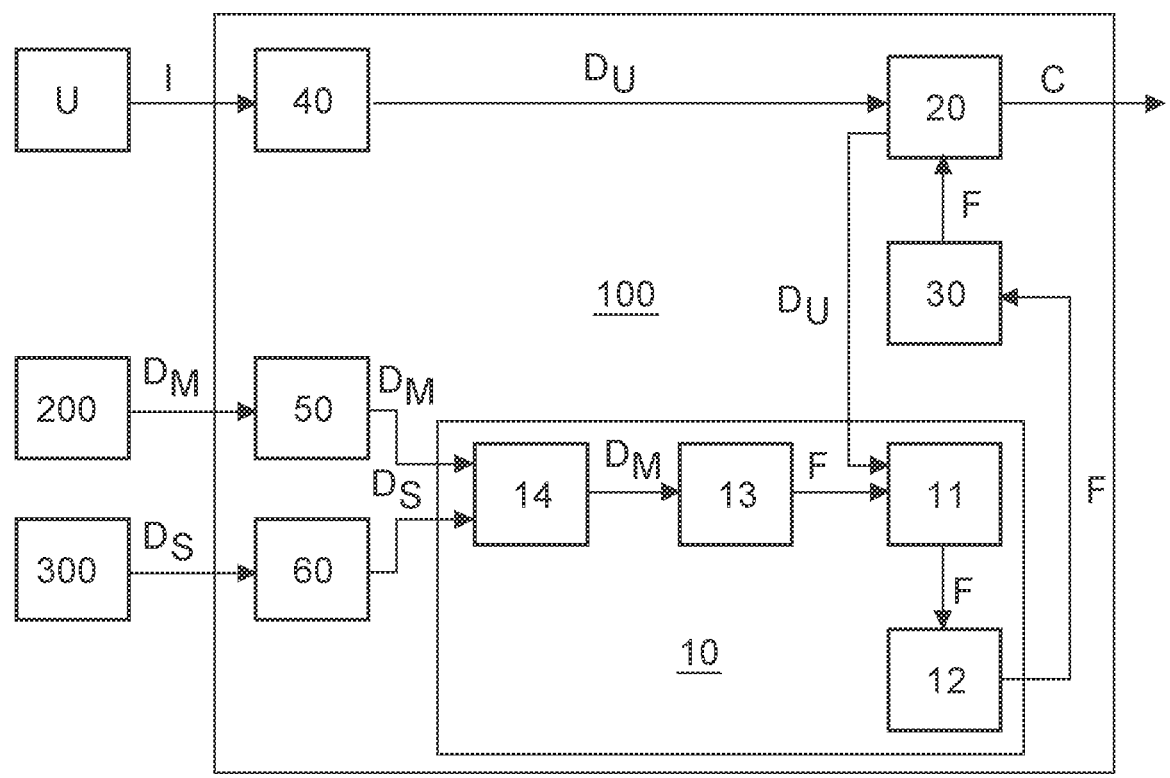

| | | | |
|---|---|---|---|
| 2008/0095331 A1* | 4/2008 | Wlasiuk | G10L 15/26 704/E15.045 |
| 2008/0183429 A1* | 7/2008 | Piety | G01H 9/008 702/182 |
| 2016/0019907 A1* | 1/2016 | Buck | G10L 21/0208 704/226 |
| 2017/0061443 A1* | 3/2017 | Wolf | H04N 21/637 |
| 2017/0103748 A1* | 4/2017 | Weissberg | G10L 15/02 |
| 2019/0114572 A1* | 4/2019 | Gold | G10L 15/26 |
| 2019/0369587 A1* | 12/2019 | Muneta | G05B 19/042 |
| 2020/0387129 A1* | 12/2020 | Chandaria | G05B 19/058 |
| 2021/0151050 A1 | 5/2021 | Liu et al. | |

OTHER PUBLICATIONS

European Patent Office, Extended European Search Report in European Patent Application No. 22179155.1, 9 pp. (Nov. 22, 2022).

\* cited by examiner

PROGRAMMABLE LOGIC CONTROLLER WITH VOICE CONTROL

CROSS-REFERENCE TO RELATED APPLICATIONS

The instant application claims priority to European Patent Application No. 22179155.1, filed Jun. 15, 2022, which is incorporated herein in its entirety by reference.

FIELD OF THE DISCLOSURE

The present disclosure generally relates to a programmable logic controller with voice control and a corresponding method program.

BACKGROUND OF THE INVENTION

In the field of programmable logic controllers, PLC, usually control commands are entered with manual control devices. Common manual control devices comprise a display that can provide executable control commands that are accessible via different menus. Thus, for executing a control command usually a plurality of user inputs are necessary. For example, the respective menu has to be navigated to by the user to find and execute the desired control command.

BRIEF SUMMARY OF THE INVENTION

According to an aspect of the invention, a programmable logic controller, PLC, comprises a central processing unit, CPU, wherein the CPU is configured to run an application program, a condition monitoring system, CMS, wherein the CMS is configured to provide condition data of an industrial unit and a microphone input, configured for providing microphone data. The microphone input is connected with the CMS, wherein the CMS is configured to receive the microphone data, determine an audio file using the received microphone data, and provide the audio file to CPU. The application program is configured to determine a control command for the PLC using the provided audio file.

In other words, the PLC as described provides the possibility of processing voice commands of a user by using the already present hardware of a CMS. This is possible, because the CMS generally provides condition data based on analog signals that are similar to analog microphone data of a voice command. The PLC is thus provided with an audio file that is determined by the CMS. The audio file is in general similar to the condition data usually provided by the CMS. Consequently, a relatively simple implementation of a PLC with voice command input is provided.

The programmable logic controller, PLC, as used herein, relates to an industrial computer that is configured to control industrial unit and/or industrial processes. In automation engineering, the PLC reads input states and writes output states for controlling sub-units of the PLC that are configured for specific tasks, for example a condition monitoring system, CMS, of an automation engineering production process. In general, the PLC comprises a central processing unit, CPU, that is relatively powerful compared to the processing units of the subunits, for example a microprocessor of the CMS.

The condition monitoring system, as used herein, relates to a subsystem of the PLC that is configured to monitor a condition of different industrial units, for example entities of an automation engineering production process. The CMS comprises a microcontroller as its own processing unit that is less powerful than the CPU of the PLC.

In one embodiment, the determined control command is directly processed by the PLC for controlling a PLC subunit. Alternatively, the control command is outputted by the PLC directly. Thus, the provided PLC allows to select control commands via voice recognition. Furthermore, the provided PLC uses already existing CMS hardware to provide the voice command input.

BRIEF DESCRIPTION OF THE SEVERAL VIEWS OF THE DRAWING(S)

FIG. 1 schematically shows PLC with voice control in accordance with the disclosure.

Figure 2:

FIG. 2 schematically shows a method for voice control of a PLC in accordance with the disclosure.

The reference symbols used in the drawings, and their meanings, are listed in summary form in the list of reference symbols. In principle, identical assembly parts are provided with the same reference symbols in the figures.

Preferably, the functional modules and/or the configuration mechanisms are implemented as programmed software modules or procedures, respectively; however, one skilled in the art will understand that the functional modules and/or the configuration mechanisms can be implemented fully or assembly partially in hardware.

DETAILED DESCRIPTION OF THE INVENTION

FIG. 1 schematically shows a programmable logic controller, PLC, 100 with voice control. The PLC 100 comprises a condition monitoring system, CMS, 10, which is a sub-unit of the PLC 100.

The PLC 100 is configured to receive condition sensor data $D_S$ from a condition sensor 300. The condition sensor 300 for example comprises a vibration sensor. The condition sensor data $D_S$ is an analog data signal. For receiving the condition sensor data $D_S$, the PLC 100 comprises a condition sensor input 60. The condition sensor input 60 provides the received condition sensor data $D_S$ to the CMS 10. The general function of the CMS 10 is to provide condition data for further processing, for example for providing alarms depending on the condition data. For example, the condition sensor data $D_S$ relates to a vibration at an industrial unit. The vibration can be analysed to evaluate a condition of the industrial unit. Based on the condition data that is provided by the CMS 10 for example maintenance of the industrial unit can be triggered.

The PLC 100 is configured to receive microphone data $D_M$ from a microphone 200. The microphone data $D_M$ is an analog data signal. For receiving the microphone data $D_M$, the PLC comprises a microphone input 50. The microphone input 50 provides the received microphone data $D_M$ to the CMS 10. The microphone data $D_M$ contains a control command C that is provided by a user U in order to control the PLC 100 with voice control.

The CMS 10 comprises a multiplexer 14 that is configured to multiplex the received microphone data $D_M$ and the received condition sensor data $D_S$. That is because the CMS 10 only comprises one an analog-digital-converter, A/D-converter, 13. As described, the CMS 10 usually processes the condition sensor data $D_S$ and as such the A/D-converter 13 is configured to convert the analog condition sensor data $D_S$ into a digital data signal, in particular a digital audio file, preferably in the WAV-format. The described PLC 100 however also provides the CMS 10 with the microphone data $D_M$, which are structurally similar to the condition sensor data $D_S$. Thus, the multiplexer 14 controls, if the A/D-converter 13 converts the analog condition sensor data $D_S$ or the analog microphone data $D_M$ into a digital audio file F. In order to provide voice control to the PLC 100, the multiplexer 14 switches the microphone data $D_M$ to the A/D-converter 13 that consequently determined the audio file F that is provided to a microcontroller 11 of the CMS 10. In other words, the fact that the analog microphone data $D_M$ and the analog condition sensor data $D_S$ are structurally similar and that the A/D-converter can determine the audio file F based on the either the microphone data $D_M$ or the condition sensor data in the same dynamic range, or in other words dynamic operation range, allows to use the A/D-converter out of purpose to provide voice control for the PLC 100.

The microcontroller 11 is the processing unit of the CMS 10 and is configured to store the determined audio file F in a CMS memory 12 of the CMS 10.

In order to provide voice control to the PLC 100, the user U should indicate that the user U wants to input a voice command. Thus, the PLC 100 comprises an input unit 40 that is configured to receive a user input I. The user input I might for example be a button to be pressed the user U, when the user U wants to input a voice command into the microphone 200 in order to provide a control command C to the PLC 100. The input unit 40 consequently provides user input data $D_U$ to a CPU 20 of the PLC 100. The CPU 20 is the central processing unit of the PLC 100. The user input data $D_U$ is provided to the microcontroller 11 of the CMS 10. The CMS 10 thus is configured to only receive microphone data $D_M$ based on the user input data $D_U$. Thus, the CMS 10 does not unnecessarily process microphone data $D_M$ that does not contain any voice command and as such control command C in the first place. For example, the microcontroller 11 controls the multiplexer 14 based on the user input data $D_U$, wherein the multiplexer 14 switches the microphone data $D_M$ to the A/D-converter 13 only when the user input data $D_U$ indicates that a voice command has been input by the user U.

The digital audio file F that contains a voice command of the user U is provided to a PLC memory 30 of the PLC 100 via a coupler bus, connecting the CMS memory 12 with the PLC memory 30. The audio file F is then provided from the PLC memory 30 to the CPU to analyse the audio file F. The CPU 20 is further configured to extract the voice command of the user U from the audio file F and thus determines a control command C that can be used to control the PLC 100. The CPU 20 for example executes a voice recognition algorithm to determine a command text from the audio file F. The CPU thus can use a semantic check algorithm to semantically interpret the command text for control commands C. Alternatively; the CPU 20 can just compare the provided audio file F with stored audio files that are associated with known control commands C.

Consequently, by using the CMS 10 in an unusual way, the PLC 100 can be provided with voice control in a relatively simple implementation.

FIG. 2 schematically shows a method for voice control of a PLC 100. In a step S10 a central processing unit, CPU, 20 of the PLC 100 runs an application program. In another step S20, a condition monitoring system, CMS, 10 of the PLC 100 provides, condition data of an industrial unit. In another step S30, a microphone input 50 of the PLC 100, provides microphone data $D_M$. In another step S40, the CMS 10, receives the microphone data $D_M$. In another step S50, the CMS 10 determines an audio file Fusing the received microphone data $D_M$. In another step S60, the CMS 10, provides the audio file F to the CPU 20. In another step S70, the CPU 20, determines a control command C using the provided audio file F.

In a preferred embodiment, the CMS comprises an analog-digital-converter, A/D-converter, wherein the A/D-converter is configured to determine the audio file using the received microphone data.

The audio file is preferably in an analog data format, further preferably is in the WAV format.

In a preferred embodiment, the A/D-converter is operated in the same dynamic range when determining the audio file using the received microphone data compared to the dynamic range when providing the audio file containing the condition data.

For example, the CMS is usually provided with vibration sensor data of a vibration sensor of an industrial unit. The A/D-converter is configured to transform the analog vibration sensor data into a digital audio file like for example the WAV format. The audio file based on the vibration sensor data is then processed by the CMS to determine condition data. For example, the CMS runs a fast-Fourier-transformation based analysis for different harmonics of the audio file to detect bearing damage of the industrial unit.

Preferably, the CMS comprises a microcontroller, which is the processing unit of the CMS. On the microcontroller runs a firmware that is configured to execute condition monitoring functions, in particular determining condition data. In other words, the same A/D-converter that is used to transform the analog vibration data into a digital WAV audio file that is the basis for the condition data can be used to transform the analog microphone data into a digital WAV audio file that is the basis for the voice command. Furthermore, the firmware of the microcontroller does not need to be changed.

In a preferred embodiment, the CMS comprises a CMS memory. Receiving the microphone data comprises storing the determined audio file in the CMS memory.

Preferably, the CMS samples the microphone data at a predetermined rate and stores the different received microphone data step by step into the CMS memory. When the sampling is finished, the audio file in the CMS memory can be further processed, for example by providing the audio file to the PLC memory.

In a preferred embodiment, the PLC comprises a PLC memory that is connected with the CMS memory. The PLC memory is configured to receive the audio file that is stored in the CMS memory and to store the received audio file in the PLC memory. The application program is configured to access the PLC memory to determine the control command.

Preferably the PLC memory is connected to the CMS memory via a coupler bus. The CPU is further preferably configured to store audio file of the CMS memory into PLC memory.

In a preferred embodiment, the PLC comprises an input unit, wherein the input unit is configured to receive a manual input of a user and to determine user input data using the received manual input. The CMS receives the microphone data dependent on the determined user input data.

Preferably, the manual input of the user comprises pressing a voice button, which is pressed by the user when he wants to enter a voice command.

Using a manual input of the user and the corresponding user input data allows to only process the microphone data when a relevant voice command of the user is present.

In a preferred embodiment, the CMS is configured to receive the microphone data for a predetermined time window after receiving the user input data.

In a preferred embodiment, the CMS is configured to receive the microphone data as long as respective user input data is received.

In a preferred embodiment, wherein the application program is configured to determine a command text using a speech recognition algorithm on the provided audio file, wherein the speech recognition algorithm is configured to recognize spoken words within the audio file and to determine the control command using a semantic check algorithm on the determined command text, wherein the semantic check algorithm is configured to semantically interpret the command text for control commands.

Preferably, the speech recognition algorithm out of kind implementation of code that allows the PLC to extract the control command from the audio file.

In a preferred embodiment, the speech recognition algorithm comprises determining a pre-processed audio file by pre-processing the audio file and determining the command text by performing model-based recognition of the spoken words in the pre-processed audio file.

In a preferred embodiment, wherein pre-processing the audio file comprises filtering and transforming the audio file and forming a feature vector of the audio file.

In a preferred embodiment, wherein the PLC comprises a signal processing library. The signal processing library comprises a plurality of function blocks. The speech recognition algorithm is performed using at least one of the plurality of function blocks.

Function blocks of a signal processing library allow to perform the computational operations with the limited resources of the controller's CPU.

In a preferred embodiment, the application program is configured to determine the control command using a comparison algorithm, wherein the comparison algorithm is configured to compare the provided audio file with recorded reference audio files representing predetermined control commands.

In a preferred embodiment, the application program is configured to validate if the determined control command complies with a predetermined list of allowable commands, to provide an error message, if the determined control command is not allowed and to execute the control command if the determined control command is allowed.

According to another aspect of the invention, a method for voice control of a programmable logic controller, PLC, comprises the following steps: Running, by a central processing unit, CPU, of the PLC, an application program. Providing, by a condition monitoring system, CMS, of the PLC, condition data of an industrial unit. Providing, by a microphone input of the PLC, microphone data. Receiving, by the CMS, the microphone data, determining, by the CMS, an audio file using the received microphone data; and providing, by the CMS, the audio file to the CPU. Determining, by the CPU, a control command for the PLC using the provided audio file.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. Programmable logic controller (PLC) with voice control, comprising:
   a central processing unit (CPU), wherein the CPU is configured to run an application program;
   a condition monitoring system (CMS) including a microcontroller and an analog-digital converter (A/D converter), wherein the CMS is configured to provide an audio file of condition data of an industrial unit received by the A/D converter from a condition data sensor connected with the CMS;
   a microphone input configured for providing microphone data;
   wherein the microphone input is connected with the CMS;
   wherein the A/D convertor is configured to receive the microphone data, determine an audio file using the received microphone data, and provide the audio file to the CPU; and
   wherein the application program is configured to determine a control command for the PLC using the provided audio file.

2. The PLC of claim 1, wherein the A/D-converter is operated in a same dynamic range when determining the audio file using the received microphone data compared to a dynamic range when providing the audio file containing the condition data.

3. The PLC of claim 1, wherein the CMS comprises a CMS memory, and wherein receiving the microphone data comprises storing the determined audio file in the CMS memory.

4. The PLC of claim 3, wherein the PLC comprises a PLC memory that is connected with the CMS memory; wherein the PLC memory is configured to receive the audio file that is stored in the CMS memory and to store the received audio file in the PLC memory; and wherein the application program is configured to access the PLC memory to determine the control command.

5. The PLC of claim 1, wherein the PLC comprises an input unit configured to receive a manual input of a user and to determine user input data using the received manual input, and wherein the CMS receives the microphone data dependent on the determined user input data.

6. The PLC of claim 5, wherein the CMS is configured to receive the microphone data for a predetermined time window after receiving the user input data.

7. The PLC of claim 5, wherein the CMS is configured to receive the microphone data provided respective user input data is received.

8. The PLC of claim 1, wherein the application program is configured to:
determine a command text using a speech recognition algorithm on the provided audio file, wherein the speech recognition algorithm is configured to recognize spoken words within the audio file; and
determine the control command using a semantic check algorithm on the determined command text, wherein the semantic check algorithm is configured to semantically interpret the command text for control commands.

9. The PLC of claim 8, wherein the speech recognition algorithm comprises: determining a preprocessed audio file by preprocessing the audio file; and
determining the command text by performing model-based recognition of the spoken words in the preprocessed audio file.

10. The PLC of claim 9, wherein preprocessing the audio file comprises filtering and transforming the audio file and forming a feature vector of the audio file.

11. The PLC of claim 9, wherein the PLC comprises a signal processing library; wherein the signal processing library comprises a plurality of function blocks; and wherein the speech recognition algorithm is performed using at least one function block from the plurality of function blocks.

12. The PLC of claim 1, wherein the application program is configured to determine the control command using a comparison algorithm, and wherein the comparison algorithm is configured to compare the provided audio file with recorded reference audio files representing predetermined control commands.

13. The PLC of claim 1, wherein the application program is configured to validate whether the determined control command complies with a predetermined list of allowable commands; provide an error message when the determined control command is not allowed; and execute the control command when the determined control command is allowed.

14. A method for voice control of a programmable logic controller (PLC), comprising:
running, using a central processing unit (CPU) of the PLC, an application program;
providing, by a condition monitoring system (CMS) including a microcontroller of the PLC and an analog-digital converter (A/D converter), condition data of an industrial unit received from a condition data sensor connected to the CMS;
providing, by the CMS to the CPU, an audio file of the condition data received by the A/D converter;
providing, by a microphone input of the PLC, microphone data;
receiving, by the A/D converter, the microphone data;
determining, by the CMS, an audio file using the received microphone data;
providing, by the CMS, the audio file to the CPU; and
determining, by the CPU, a control command for the PLC using the provided audio file.

15. The PLC of claim 1, wherein the CMS comprises a multiplexer that is configured to multiplex the received microphone data from the microphone input and the received condition data from the condition data sensor and to selectively switch directing the microphone data or the condition data to the A/D converter.

* * * * *